Dec. 6, 1932.  R. R. MILLER  1,890,228
HYDRAULIC BULLDOZER
Filed May 20, 1929  2 Sheets-Sheet 1

Inventor:
Royal R. Miller,
By Wallace R. Lane
Attorney.

Dec. 6, 1932.　　　R. R. MILLER　　　1,890,228
HYDRAULIC BULLDOZER
Filed May 20, 1929　　　2 Sheets-Sheet 2
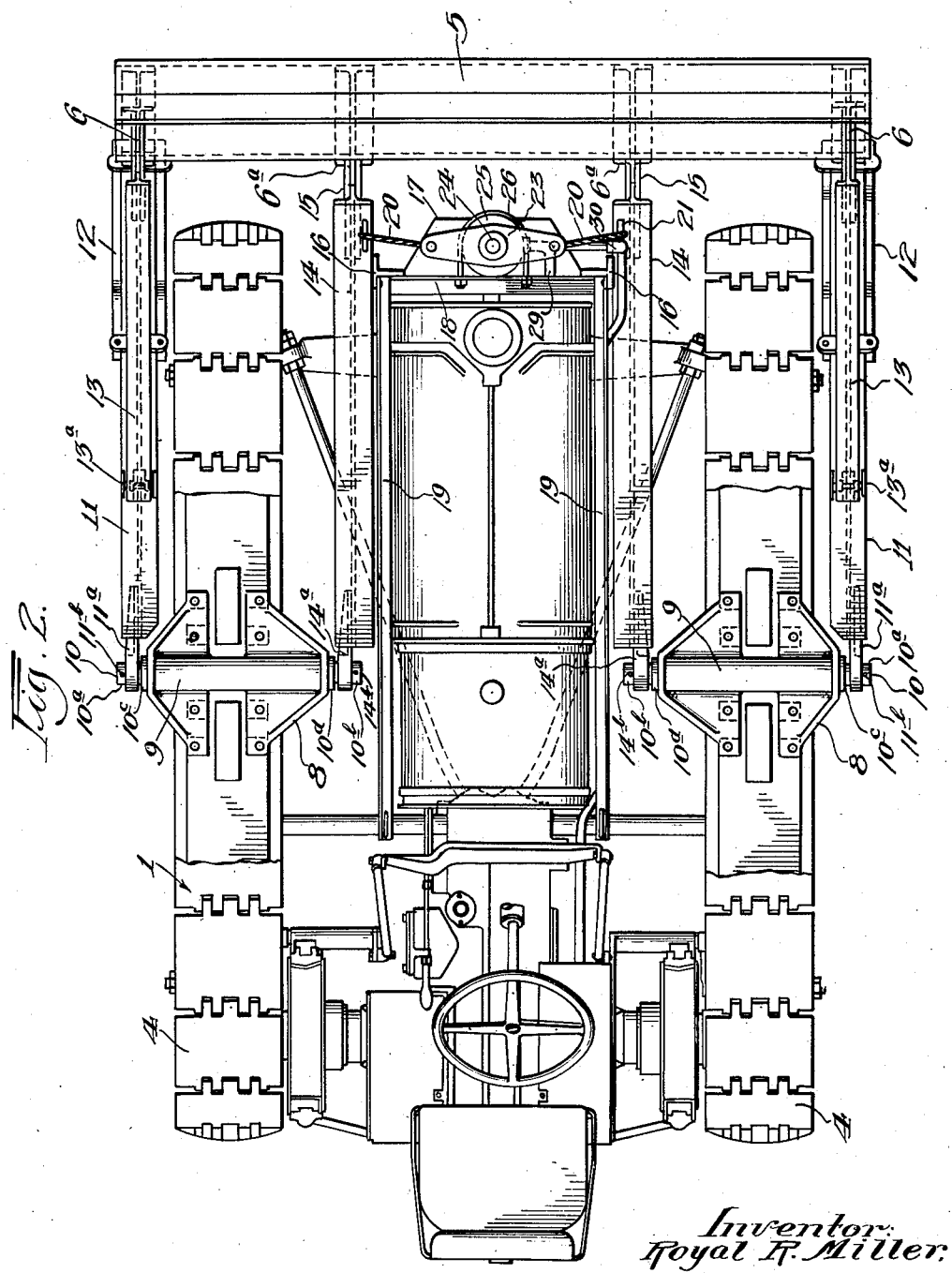

Patented Dec. 6, 1932

1,890,228

UNITED STATES PATENT OFFICE

ROYAL R. MILLER, OF ELKHART, INDIANA, ASSIGNOR TO WILLIAM MITCHELL BLAIR, OF CHICAGO, ILLINOIS

HYDRAULIC BULLDOZER

Application filed May 20, 1929. Serial No. 364,507.

This invention relates to hydraulic bulldozers, and more particularly to the provision of such a construction adapted for attachment with a tractor.

Among the objects of my invention are to provide a hydraulic bulldozer of novel construction, and adapted to be readily operated by the operator of the tractor or other prime mover; to provide a novel construction of lifting means for said bulldozer; to provide a novel construction of the link elements which transmit the thrust from the bulldozer to the tractor or prime mover; further to provide a hydraulic bulldozer of maximum simplicity, efficiency, economy and ease of operation; and such further objects, advantages and capabilities as will later more fully appear and are inherently possessed thereby.

My invention further resides in the combination, construction and arrangement of parts illustrated in the accompanying drawings, and while I have shown therein a preferred embodiment, I desire it to be understood that the same is susceptible of modification and change without departing from the spirit of my invention.

In the drawings:

Fig. 2 is a top plan view of the entire mechanism with parts cut away to show how my bulldozer may be conveniently attached to the ordinary tractor.

Figure 1:
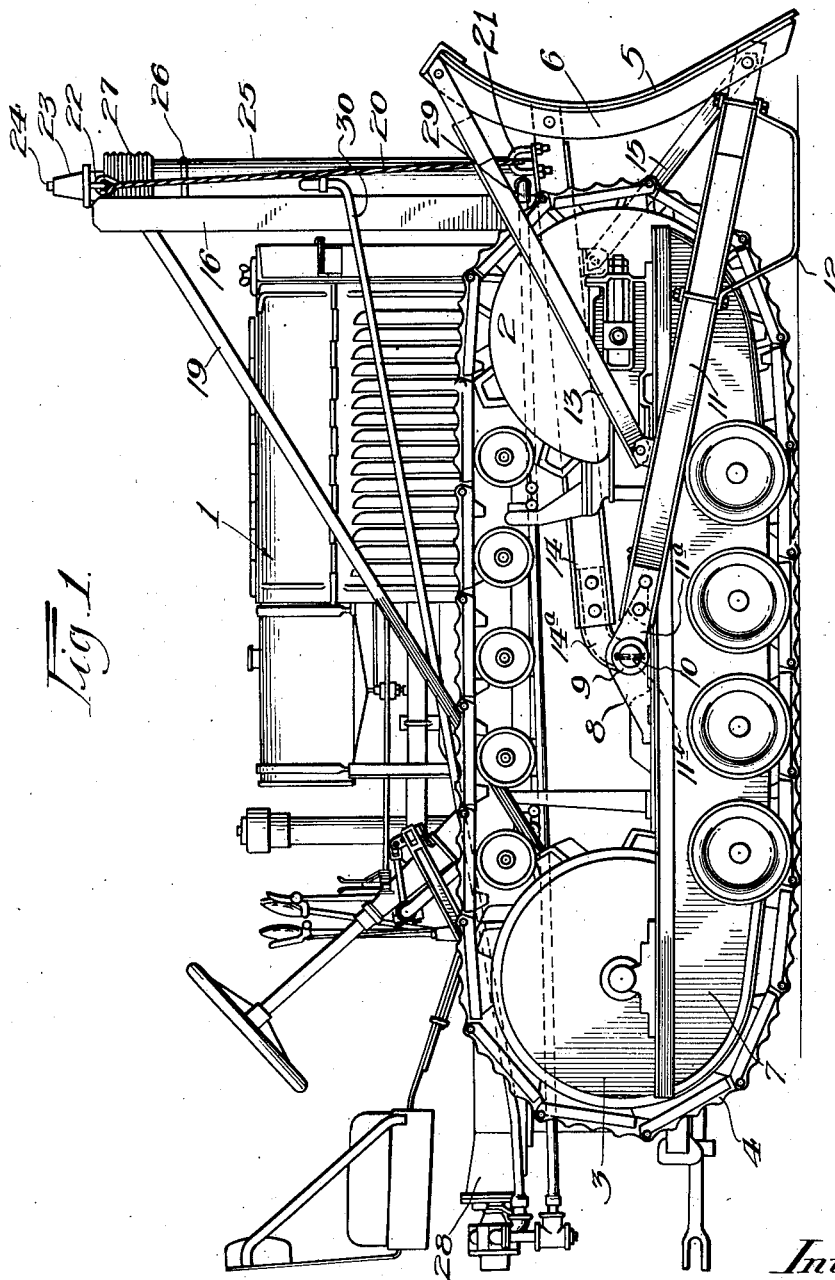
Fig. 1 is a view in side elevation of a tractor to which is attached my new and novel bulldozer with the elevating mechanism attached thereto.

Referring now more in particular to the drawings, the numeral 1 designates generally a caterpillar tractor, provided with front adjustable wheels 2, and rear driving wheels 3, which engage the caterpillar treads 4. My novel construction of hydraulic bulldozer is adapted to be applied to the ordinary tractor or caterpillar tractor or other prime mover, this construction being clearly disclosed in the drawings.

The bulldozer 5, located at the front of the tractor 1, is provided with the reinforcing members 6, and 6$^a$ vertically located, and transversely reinforcing the sheet metal strip or strips which form the operating surface of the bulldozer. These reinforcing members or elements 6 and 6$^a$ provide means for preventing the warping, twisting or displacement of the sheet metal pieces forming the face of the bulldozer. Centrally located on each of the built-up girder members or side plates 7 is a bracket or shoe 8, suitably connected thereto, a portion 9 of which serves as a sleeve or bearing unit for a stub shaft 10. The stub shafts 10, one of which are located on opposite sides of the tractor 1 and connected to the girders or side plates 7, has extended axle portions 10$^a$ and 10$^b$, on the outside and inside of the treads 4 respectively. The collars 10$^c$ and 10$^d$ are adjustably attached to the stub shaft and are adapted to hold the stub shaft 10 in the sleeve 9 and to prevent any lateral movement thereof. I-beams 11, located on opposite sides of the tractor and on the outside of the caterpillar treads 4, are connected to the reinforcing elements 6 at the lower edge of the bulldozer and are rotatably connected to the axle 10$^a$ by means of the casting 11$^a$. The I-beams 11 and castings 11$^a$ are held in a rotatable position on the axle 10$^a$ by the cotter-pin or other means 11$^b$.

A shoe 12 at the forward end of the I-beam is connected thereto by any suitable means and is designed to ride along the surface of the ground, when the bulldozer is in a cutting or scraping position and which eliminates to a great extent the downward thrust on the blade member, and further prevents the forward cutting edge of the bulldozer 5 from digging into the ground, over which the caterpillar treads are operated. The bulldozer is further held in position by the angles 13, one end of which is connected to the top of the reinforcing element 6, the other end of which is suitably connected by means of the lug 13$^a$ to the I-beam 11. In order to more evenly distribute the load bearing against the bulldozer, I-beams 14, oppositely positioned on the tractor 5 and interiorly of the treads 4 and are attached to the reinforcing elements 6$^a$, at one end, and rotatably connected to the interior projecting axles 10$^b$ of the shafts 10 by any suitable means, as by means of the castings 14$^a$. The I-beams 14 and castings 14ª are held in a rotatable position on the axles 10ᵇ by the cotter-pins or other means 14ᵇ. Each diagonal link member 15 has one end connected to the lower end of a reinforcing element 6ª, and the other end connected to an I-beam 14 by a lug or other means, and further reinforces the bulldozer 5, and transmits its proportion of the load bearing against the bulldozer to the I-beam 14, and then to the extended end portion 10ᵇ of the shaft 10. Although I have shown and described a preferred arrangement of these link elements and the way in which they are attached to the bulldozer and to the bearing member on the tractor, I wish it to be understood that any structural shape could be used and any means of connection employed without departing from the spirit of my invention.

Mounted on the opposite sides of the forward end of the tractor are vertical T-beams 16 attached to a cylinder bracket 17, at their lower ends, and connected by the plate 18 at their upper ends. Diagonal brace angles or rods 19 are attached to the housing or frame work of the power plant at their lower ends, and to the flanges of the upright T-beams at their upper ends. This construction of bracing means provides a substantially rigid construction, and holds the upright members in fixed position.

Cables 20 are attached by means of U-bolts 21 to the flanges of the I-beams 14. The other end of these cables are attached to the eyes 22 on the cross head 23. This cross head 23 is mounted on the upper end of a piston rod 24 of a piston (not disclosed) mounted in the cylindrical casing 25. The lower portion of the cylinder 25 is mounted in the bracket 17, and its upper end is braced by means of a U-bolt 26, passing around the cylinder or casing 25, and connected to the plate 18.

The piston rod is enclosed and protected from grit and dirt by means of a collapsible canvas boot 27. Hydraulic means 28, located on the rear of the tractor 1, having intake pipe 29 and outlet pipe 30 to the cylinder 25, provides means for raising and lowering the bulldozer 5. These hydraulic means may be of any suitable design or construction, which are readily and easily attached to the tractor and driven by the power take-off thereof. When it is desired to raise the bulldozer, the hydraulic means 28 is operated by suitable levers adjacent to the operator's seat which forces fluid under pressure through the intake pipe 29 at the lower end of the cylinder 25; thus forcing upwardly the piston in the cylinder, which in turn raises the cross head 23, and likewise raises the bulldozer by means of the cables 20. The operator by suitable operating mechanism may hold the fluid under pressure in the cylinder casing 25 which in turn holds the bulldozer in any of its raised positions as long as desired. The operator may lower the bulldozer by suitably operating the mechanism controlling the hydraulic means, when the fluid forced into the cylinder casing under pressure may be released, thereby causing the piston to descend and likewise the bulldozer.

Although I have shown my bulldozer attached to a caterpillar tractor, I wish it to be understood that my bulldozer, together with the hydraulic means for raising and lowering the same, could be attached to any other tractor or prime mover, without departing from the spirit of my invention.

Having thus disclosed my invention, I claim:

1. In a bulldozer mounted upon a caterpillar tractor provided with driving treads, arms positioned on either side of the treads and oppositely located on said tractor, a blade mounted on said arms, hydraulic means operated by a pump driven by the power take-off of said tractor, and cables attached to certain of said arms and operated by said hydraulic means for raising and lowering said arms and blade.

2. In a bulldozer adapted to be mounted upon a caterpillar tractor provided with treads, stub shafts mounted in the framework of driving treads, arms positioned on either side of said treads and oppositely located on said tractor, said arms being rotatably mounted on the extended portions of said shafts, a blade mounted on said arms, hydraulic means operated by the power take-off of the tractor, and cables attached to certain of said arms and operated by said hydraulic means for raising and lowering said arms and blades.

3. In a bulldozer adapted to be mounted upon a caterpillar tractor provided with treads, stub shafts mounted in the frame work of said treads, arms positioned on either side of said treads and oppositely located on the tractor, said arms being rotatably mounted on the extended portions of said shafts, a blade mounted on said arms, means on said arms for guiding said blade, vertical beams mounted on the sides of the tractor, hydraulic means including a casing secured to said beams, a cross head in said casing operated by the power take-off of the tractor, and cables attached to certain of said arms and operated by said cross head for raising and lowering said arms and blades.

4. In a mechanism adapted to be mounted on a tractor provided with driving treads, side plates for said tractor, stub shafts mounted on said plates, arms positioned on opposite sides of said treads and said tractor, said arms being pivotally mounted on the extended portions of the shafts, a road working tool mounted on said arms, and hydraulic means operated by the power take-off of the tractor for raising and lowering the arms and road working tool.

5. In a bulldozer adapted to be mounted upon a caterpillar tractor provided with driving treads, stub shafts mounted on the framework of the driving treads and extending laterally thereto, arms positioned on each side of said treads and mounted on said stub shafts, a blade secured to said arms, and means for raising and lowering said arms and blade.

6. In a bulldozer adapted to be mounted on a tractor provided with driving treads, a blade therefor, a pair of arms secured adjacent each end of said blade, said arms extending rearwardly of said tractor, means for mounting said arms for movement thereof on both sides of each of the driving treads, and means for raising and lowering said blade and arms.

7. In a hydraulic bulldozer adapted for attachment to a tractor, stub shafts mounted on said tractor, pairs of arms positioned one pair on each side of said tractor and rotatably mounted on the ends of said shafts, a blade mounted on the forward end of said arms, and hydraulic means including a hydraulically operated cross head connected with certain of said arms for lifting said blade.

8. In a hydraulic bulldozer adapted for attachment to a tractor, stub shafts mounted at the opposite sides of said tractor, a plurality of arms positioned on each side of said tractor and rotatably mounted on the opposite ends of said shafts, a blade mounted on the forward end of the arms, and hydraulic means having a crosshead connected with certain of said arms for lifting the blade.

9. In a hydraulic bulldozer adapted for attachment to a tractor, stub shafts mounted at the opposite sides of said tractor, a plurality of arms positioned on each side of said tractor and rotatably mounted on the opposite ends of said shafts, a blade mounted on the forward end of the arms, and hydraulic means having a cross head connected with the inwardly mounted arms for lifting the blade.

10. In a hydraulic bulldozer adapted to be attached to a tractor, a plurality of arms mounted on opposite sides of said tractor, a blade connected to said arms and movably mounted at the forward end of said tractor, a casing mounted at the forward end of said tractor and adjacent said blade, and a crosshead hydraulically operated by a piston in said casing and immediately above said blade, and cables directly connected with certain of said arms and crosshead for moving the blade.

11. In a hydraulic bulldozer adapted to be attached to a tractor, a plurality of arms pivotally mounted at each side of said tractor, a blade connected to said arms, upright supports mounted at the front end of said tractor, a cylindrical chamber secured to said uprights, and a cross head hydraulically operated by a piston in said chamber and above said blade, and cables directly connected with certain of the pivotally mounted arms and crosshead for moving the blade.

12. In a hydraulic bulldozer adapted to be mounted upon a caterpillar tractor provided with treads, a plurality of arms pivotally mounted at each side of the tractor, a blade connected to said arms at the forward end of said tractor, a casing mounted on the tractor and adjacent said blade, and a crosshead hydraulically operated by a piston in said casing, and cables directly connected with certain of said arms and crosshead for moving the blade.

In witness whereof, I hereunto subscribe my name to this specification.

ROYAL R. MILLER.